Inventors
WILLY POULIART
MARTINUS DEN HERTOG
HANS H. ADELAAR
By Robert Harding Jr.
Attorney

METHOD OF LINE SCANNING FOR AUTOMATIC TELEPHONE SYSTEMS

Filed June 13, 1950 2 Sheets-Sheet 2

Inventors
WILLY POULIART
MARTINUS DEN HERTOG
HANS H. ADELAAR
By Robert Harding Jr.
Attorney United States Patent Office 2,724,018

Patented Nov. 15, 1955

2,724,018

METHOD OF LINE SCANNING FOR AUTOMATIC TELEPHONE SYSTEMS

Willy Pouliart, Martinus den Hertog, and Hans H. Adelaar, Antwerp, Belgium, assignors to International Standard Electric Corporation, New York, N. Y., a corporation of Delaware Application June 13, 1950, Serial No. 167,752

Claims priority, application France June 14, 1949

9 Claims. (Cl. 179—18)

This invention relates to a method of line scanning for an automatic telephone switching system making it possible by static means to determine the identities of one or more lines from which calls are being originated and to transmit indications of such identities to a device which initiates the necessary operations for connecting said line or lines to selective devices.

One of the characteristics of the invention consists of a line scanning device in an automatic telephone exchange for determining the identities of calling lines and for causing said lines to be severally put into connection with selective devices, comprising the use of the scanning system which was the object of the patent application filed by M. den Hertog on June 12, 1950, for a "Pulse Controlled Rectifier Network," Serial No. 167,673, now Patent No. 2,563,589, means being provided for applying to each of the input elements of the scanning device, there being such an element individual to each line, a characteristic electrical condition dependent upon the state of that line, in order to cause the periodic appearance at the output of the scanning device of successive indications of the instantaneous states of all the lines associated with the scanning device.

Another characteristic of the invention consists of means making it possible to apply a characteristic electrical condition to an input element of the scanning device, said condition depending upon the state of the line with which said element is associated, said means being composed of two resistors, one of which is connected to each of the line conductors, said resistors being moreover connected respectively to the two poles of a battery, and of a third resistor connected at one end to one of said line conductors and at the other end to the scanning device and constituting the said input element thereof.

Another characteristic of the invention consists in the fact of marking the busy state of a line already connected to a selective device by applying the potential of one pole of said battery, through an appropriate resistance, to one of the bank contacts of said device, said contact being directly connected to that end of said third resistor which is connected to the scanning device, whereby said scanning device is prevented from indicating the presence of a calling condition on said line.

Another characteristic of the invention consists in means, comprising a line scanning device in an automatic telephone exchange for determining the identity of a calling line, an indication of said identity being thereafter available for use in directing a line finder to the contacts in its terminal bank to which said calling line is connected, in order to put said line into connection with other selective devices, whereby the well-known procedure of causing said line finder to hunt for a characteristic potential on a bank contact thereof, which potential distinguishes said calling line from lines not in the calling condition, is avoided.

Other characteristics will appear from the following description given as a non-limitative example, with reference to the attached drawings.

Figure 1:
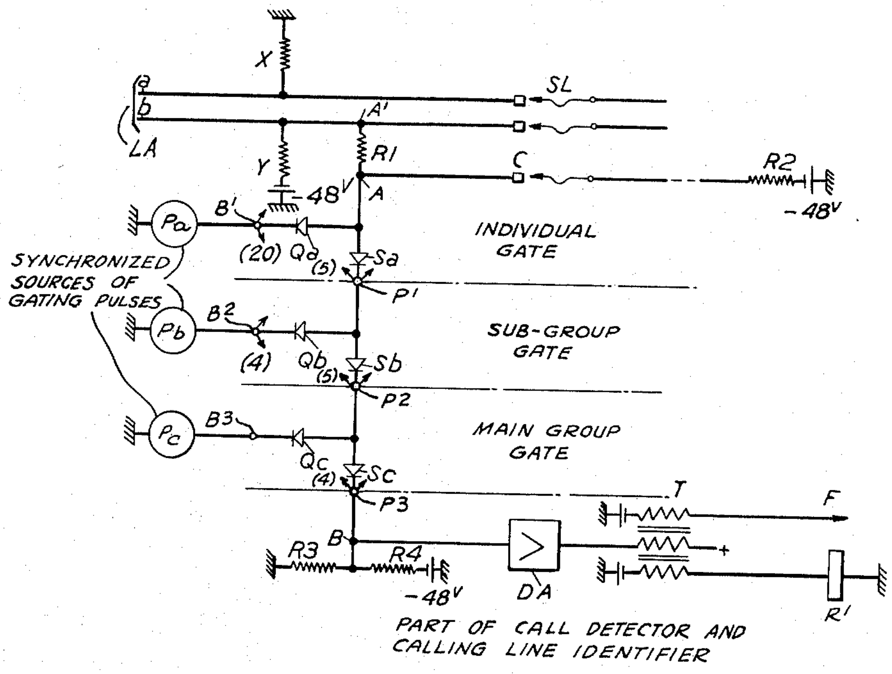
Fig. 1 shows a scanning device for subscribers' lines which will be assumed by way of example to be provided for the scanning of 100 subscribers' lines, together with other elements of the individual equipment provided at the exchange end of one of said subscribers' lines and a part of a call detector and calling line identifier common to all said lines, in accordance with the invention.

With reference to Fig. 1, each subscriber's line, such as line LA, is terminated at an automatic exchange on contacts in the terminal bank of a line finder SL, which contacts may be multipled in the well-known manner to similar contacts in the terminal banks of other line finders and also of final selectors, not shown in the drawing. There are connected to the line conductors *a* and *b* the resistors X and Y which may, for example, in a preferred embodiment, have resistances of 15,000 and 30,000 ohms, respectively. The other ends of said resistors are connected to the grounded and ungrounded poles, respectively, of the battery of the automatic exchange which may, for example, furnish a potential at its ungrounded pole of —48 v. The line conductor *b* is also connected at point A' to one end of a third resistor R1 which may have a preferred resistance of 30,000 ohms and the other end of said resistor is connected at point A to a contact C in the terminal bank of said line finder SL, which contact also may be multipled to similar contacts in the terminal banks of other line finders and of final selectors. Furthermore, the said point A is connected through three rectifiers S*a*, S*b*, S*c*, in series to a terminal P3, to which is also connected the input terminal B of a call detector and calling line identifier, to be described in greater detail hereafter, which may be common to 100 subscribers' lines; the three rectifiers are so poled as to offer a low resistance to the flow of current from the point A to said terminal P3 when the potential at the former is more positive than that at the latter, whereas they offer a high resistance to the flow of current in the opposite direction. The arrow-heads at terminal P3 indicate in the well-known manner that other rectifiers S*c* associated with other subscribers' lines, not shown on the drawing, are also connected thereto, as will be explained. The said input terminal B is connected both to the grounded pole of the exchange battery through a resistor R3 and to the ungrounded pole through a resistor R4; these resistors are so dimensioned that the potential at terminal B is maintained at —40 v. in the normal condition of the circuit, that is, when no current is flowing between point P3 and said terminal.

It will be evident that the circuit elements and connections described in the preceding paragraph (the other elements shown in Fig. 1 being for the moment disregarded) constitute a relayless line circuit for use at the exchange end of a subscriber's line, together with a biasing potentiometer. A relayless line circuit, comprising elements substantially identical with those described, and interconnected in substantially the same manner as in Fig. 1 hereof, has been disclosed in British Patent No. 641,819, granted to one of the present applicants and published on August 23, 1950.

Figure 2:
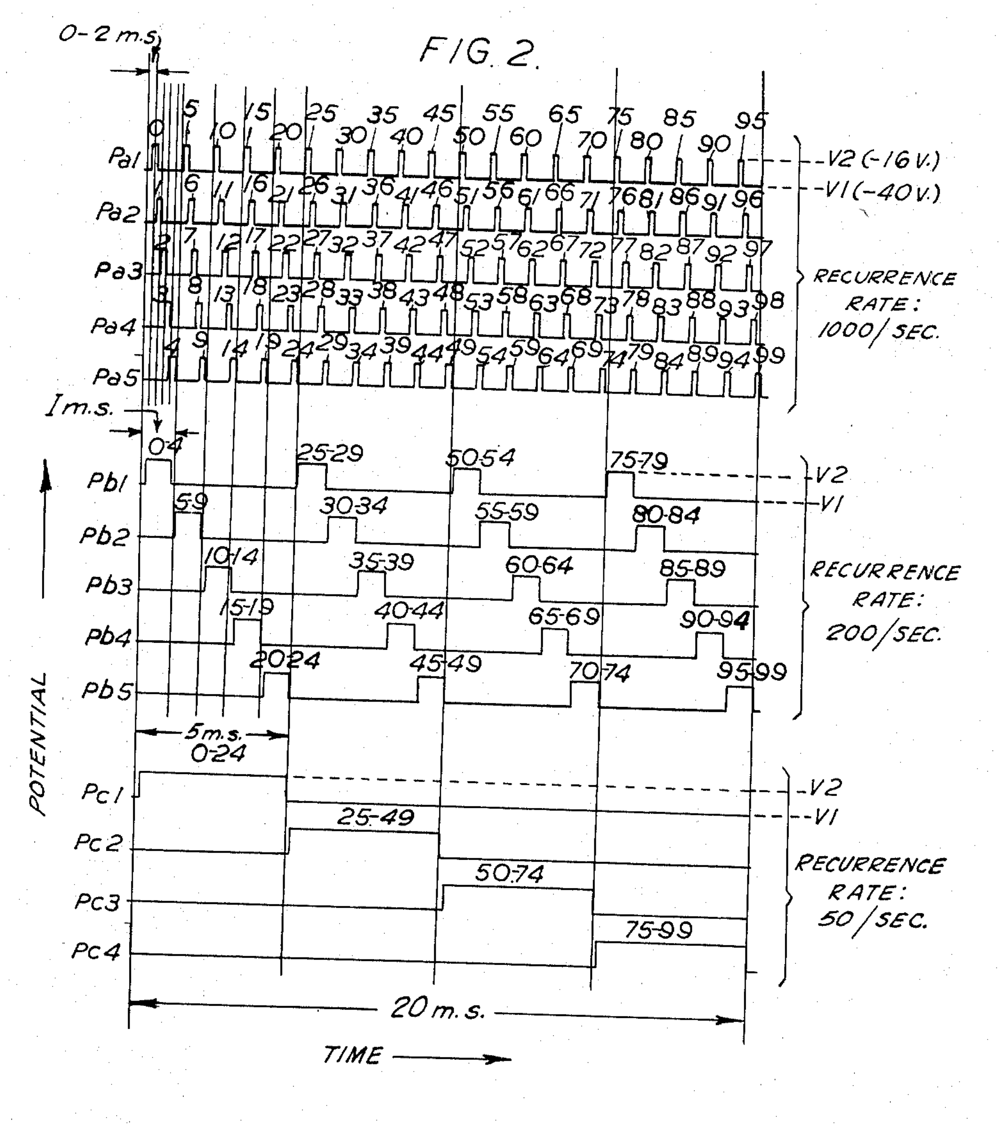
Fig. 2 is a diagrammatic representation of the variations with time of the output voltages of the various synchronized sources of gating pulses used with the scanning devices illustrated in Fig. 1.

According to Fig. 2 of this patent, of which certain features will now be compared with Fig. 1 hereof, one conductor L*a* of a subscriber's line terminates at an automatic exchange on a bank contact of a line finder LF and is also connected through a resistor *a* to the grounded pole of the exchange battery; the other conductor L*b* of the line terminates on another bank contact of the line finder and is also connected through a resistor *b* to a point *t* and to a third bank contact of the line finder;

said point $t$ is also connected through a rectifier Re1 (which may in practice, as stated in the patent, comprise three or more rectifying elements in series) to the input terminal $p$ of a call detector comprising potentiometer means P1 for maintaining the potential at said terminal $p$ at a negative value intermediate between ground potential and the potential of the ungrounded pole of the battery; arrow-heads at terminal $p$ indicate that other rectifiers Re1 associated with other subscribers' lines may be connected thereto and that the call detector may, therefore, be common to a plurality of subscribers' lines; the said rectifier Re1 is so poled as to offer a low resistance to the flow of current from the point $t$ to said input terminal $p$; all these connections have exact counterparts in Fig. 1 hereof. Moreover, the said line conductor L$b$ of the patent, like the line conductor $b$ of Fig. 1 hereof, is connected through a resistor to the ungrounded pole of the battery; however, in the former case, said resistor comprises in fact two resistors in series, namely, resistor $c$ connected to the point $t$ and the aforementioned resistor $b$, whereas in the latter case the resistor Y is directly connected to the line conductor $b$, as already stated; this difference constitutes one of the characteristics of the present invention, as will be explained hereafter.

According to the teaching of the British patent, when the subscriber's line is in the idle condition, that is, when there is no call thereon, the point $t$ is standing at a potential approximating that of the ungrounded pole of the battery, which is negative with respect to the potential normally impressed on the common input terminal $p$ by the aforementioned potentiometer means; consequently, no current flows from the point $t$ towards the call detector. When now the subscriber closes a loop across the line conductors L$a$, L$b$, in order to originate a call, the potential at the point $t$ becomes more positive (now approximately —24 v., by reason of the current flowing around the line loop, than that at terminal $p$; under these conditions, rectifier Re1 offers a low resistance and current flows steadily from the point $t$ towards terminal $p$, raising the potential at the latter sufficiently to enable the call detector to detect and record the presence of a call. Thereafter, the wipers of line finder LF are caused to hunt for the calling line, which is now distinguished from non-calling lines by the fact that its third contact in the bank of the line finder, being connected to the point $t$ as stated, is standing at a potential substantially more positive than that at the third contacts of non-calling lines; it is to be noted that the distinction is effective, despite the commoning of calling and non-calling lines at the input terminal $p$, in virtue of the substantially unidirectional conductivities of the respective rectifiers Re1 and their consequent decoupling effect. When a subscriber's line is not in the calling condition, but nevertheless has a high-resistance leak across the line conductors, the potential at the point $t$ becomes slightly more positive than that of the ungrounded pole of the battery; however, this potential is still negative with respect to the potential normally impressed on the input terminal $p$ and no call is registered by the call detector; moreover, the raised potential at the point $t$ is insufficient to cause a hunting line finder to mistake a leaky line for a calling line.

It is a primary object of the present invention to provide a relayless line circuit of the type disclosed in the said patent and including novel and economical means for determining the identity of a calling line in a group of lines all served by a line finder, an indication of said identity being then available for directing said line finder to the contacts in its terminal bank to which said line is connected, whereby the above described well-known "hunting" action of the line finder may be avoided and a type of line finder not readily adaptable to such hunting action, for example a cross-bar switch, may be employed. To this end, the relayless line circuit which has already been described in detail is further organized in combination with a static line scanning device of the type disclosed in the aforementioned U. S. Patent No. 2,563,589, granted to one of the present applicants, and this will now be described.

The line scanning device, like the call detector and calling line identifier to which reference has already been made, may be arranged to serve 100 subscribers' lines and comprises a plurality of mutually synchronized sources of gating pulses, of which three are shown in Fig. 1, designated P$a$, P$b$, and P$c$, and a matrix of rectifiers including the rectifiers S$a$, S$b$, S$c$ already mentioned. The said pulse sources may be of any suitable design such that when one output terminal is grounded the potential generated at the other output terminal has a steady value V1, for example —40 v., during the greater part of a repetitive cycle, and a different steady value V2, for example, —16 v., during the lesser part or pulse period of said cycle.

A preferred scanning device for 100 subscribers' lines, only such part of which as is necessary for a complete understanding of the invention is illustrated in Fig. 1, requires a total of fourteen such pulse sources, of which the periodic variations of potential with time are illustrated diagrammatically in Fig. 2.

With reference now to this drawing, four of the sources, designated P$c$1–P$c$4, respectively, have a comparatively slow recurrence rate, for example 50 pulses per second, the duration of each pulse being 5 m. s. or a quarter of their 20 m. s. repetitive cycle. Furthermore, the pulses generated by the four sources P$c$ are mutually displaced in time in such a way that they succeed each other without overlapping, as indicated. Another five of the sources, designated P$b$1–P$b$5, respectively, have a recurrence rate four times as great as that of the sources P$c$, for example 200 pulses per second, the duration of each pulse being 1 m. s. or a fifth of their 5 m. s. repetitive cycle; the pulses generated by the five sources P$b$ are all similarly mutually displaced so as not to overlap one another; moreover, the sources P$b$ are so synchronized with the sources P$c$ that the pulse period of each source P$c$ encompasses one pulse from each of the five sources P$b$. The remaining five sources, designated P$a$1–P$a$5, respectively, have a recurrence rate five times as great as that of the sources P$b$, for example, 1000 pulses per second, the duration of each pulse being 0.2 m. s. or a fifth of their 1 m. s. repetitive cycle; these pulses also are mutually displaced and do not overlap one another and they also are so synchronized with the sources P$b$ that the pulse period of each source P$b$ encompasses one pulse from each of the five sources P$a$. It follows that the pulse period of each source P$c$ encompasses five cycles of each of the sources P$a$ or a total of 25 P$a$ pulses, and that the overall repetitive cycle of the complete set of pulse sources, which we may call the scanning cycle, encompasses a total of 100 P$a$ pulses.

If now the numbers 0, 5, 10 . . . 95 are assigned to the twenty successive intervals of 0.2 m. s. corresponding to the twenty pulses P$a$1 occurring in one scanning cycle, the numbers 1, 6, 11 . . . 96 to the pulses P$a$2, and similar progressive numbers to the pulses P$a$3, P$a$4, P$a$5; if also numbers are assigned to the P$b$ and P$c$ pulses corresponding to the numbers assigned to the P$a$ pulses that they respectively encompass; then it will be evident from a scrutiny of Fig. 2 that any particular one of the 100 such intervals of 0.2 m. s. can be completely identified by the coincidence of one P$a$ pulse, one P$b$ pulse and one P$c$ pulse. For example, the interval designated 66 on the drawing is identified by the coincidence of pulses P$a$2, P$b$4 and P$c$3, to the exclusion of all the remaining 99 intervals.

The manner in which the rectifier matrix of the scanning device is assembled and in which the fourteen sources of gating pulses are connected thereto will now be described, with reference again to Fig. 1.

Each of the 100 subscribers' lines, including the line LA alone illustrated, and served by a group of line finders including finder LF and by one scanning device, is provided as stated with a resistor R1, which constitutes one of a hundred input elements of the said device, and a rectifier Sa; directly associated with each rectifier Sa is another rectifier Qa connected to a terminal B1 and so poled as to offer a high resistance to, and so to effectively block, the flow of current from said terminal B1 towards the point A. The pair of rectifiers Sa, Qa, constitutes an individual "gate" for the subscriber's line LA and is another element of the scanning device.

The said 100 lines may conveniently be numbered serially, for example, from 0 to 99, and are divided for scanning purposes into four main groups, each of 25 lines, the first group including the lines numbered 0–24, the second lines 25–49, and so on. Furthermore, each main group of 25 lines is sub-divided into five sub-groups each of five lines, a total of 20 sub-groups, the first sub-groups of the first main group including the lines 0–4, the second lines 5–9, and so on.

The five rectifiers Sa, of the five lines composing the sub-group including line LA, are commoned together at terminal P1, as indicated by the arrow-heads at said terminal and the number 5 in parentheses alongside it; it will, therefore, be understood that there are in the scanning device twenty terminals such as terminal P1, each associated with five lines, and consequently twenty rectifiers such as rectifier Sb, each connected to a terminal such as terminal P2. Directly associated with each rectifier Sb is another rectifier Qb, connected to a terminal B2 and so poled as to block the flow of current from said terminal B2 towards terminal P1. The pair of rectifiers Sb, Qb, constitutes a sub-group "gate" for the subgroup of five lines including line LA and is another element of the scanning device.

The five rectifiers Sb, of the five sub-groups composing the main group including line LA, are commoned together at terminal P2, as indicated by the arrow-heads and number 5 in parentheses; it will, therefore, be understood that there are in the scanning device four terminals such as the terminal P2, each associated with 25 lines and consequently four rectifiers such as the rectifier Sc. Directly associated with each rectifier Sc is another rectifier Qc connected to a terminal B3 and so poled as to block the flow of current from said terminal B3 towards terminal P2. The pair of rectifiers Sc, Qc, constitutes a main group "gate" for the group of 25 lines including line LA, and is yet another element of the scanning device.

The four rectifiers Sc, of the four main groups composing the 100 lines including line LA, are connected together at terminal P3, as indicated by the arrow-heads and the number 4 in parentheses.

From the foregoing description, it will be understood the points A associated with the 100 input elements R1 are severally and progressively connected, via an equal number of individual gates, a smaller number of subgroup gates and a still smaller number of main group gates, all arranged in "tree" form, as indicated in Fig. 1, to a single output terminal P3.

Finally, the twenty rectifiers Qa associated with the lines numbered 0, 5, 10 . . . 95, respectively, are commoned together at a terminal B1, which is also connected to the output terminal of the aforementioned source of gating pulses Pa1; those associated with the lines numbered 1, 6, 11 . . . 96 are commoned at another terminal B1, to which the source Pa2 is connected, and so on; there are thus in the scanning device 5 terminals such as terminal B1, each connected to one of the sources Pa. Similarly, the four rectifiers Qb associated with the subgroups including the lines numbered 0–4, 25–29, 50–54, etc., respectively, are commoned at a terminal B2, to which the pulse source Pb1 is connected; those associated with the sub-groups, 5–9, 30–34, 55–59, etc., respectively, are commoned at another terminal B2, to which the source Pb2 is connected, and so on; there are thus five terminals such as terminal B2, each connected to one of the sources Pb. Similarly the rectifier Qc associated with the main group including the lines numbered 0–24 is connected at a terminal B3 to the source Pc1, that associated with the main group 25–49 is connected at another terminal B3 to the source Pc2; there are thus four terminals such as terminal B3, each connected to one of the sources Pc.

The manner in which the scanning system operates will now be explained.

When the subscriber's line LA is in the normal condition, that is, is not in use, the point A is standing at a potential of −48 v. derived from the exchange battery via resistors Y and R1, whereas the input terminal B of the call detector and calling line identifier, still to be described, is standing at a potential of approximately −40 v., as already explained. The three terminals B1, B2, B3, shown in the drawing being at all times held at a potential of either −40 v. (between pulses) or −16 v. (during a pulse) by the sources Pa, Pb, Pc to which they are respectively connected, the potential at the point A is thus negative with respect to each of the said terminals B, B1, B2, B3; accordingly, owing to the orientation of the associated rectifiers Sa, Qa, Sb, Qb, Sc, Qc, no current flows through the scanning device from the point A to terminal B. All the 100 lines served by the scanning device being similarly connected, it will be understood that the potential at said terminal B, common to all of them, remains substantially undisturbed at −40 v. so long as no calling condition appears on any one of them.

When, however, the subscriber on one of the lines, for example line LA, originates a call by closing a loop across the line conductors a, b, the points A' and A are both brought to a potential of approximately −16 v., owing to the potential drop in resistor Y resulting from the current now flowing around said loop from ground at resistor X to battery at resistor Y. During the intervals between the pulses delivered by the source Pa connected to terminal B1, when the potential at said terminal is held at −40 v. as stated, current flows from the point A to said source Pa through the low resistance of rectifier Qa, thus making the potential at the point A more negative and effectively preventing the flow of current through rectifier Sa towards terminal B. It may be said that the individual "gate," comprising rectifiers Sa, Qa, is "closed" at these times. Similarly, during the intervals between the pulses delivered by the source Pb connected to terminal B2, the sub-group gate, comprising rectifiers Sb, Qb, is closed, while during the intervals between the pulses delivered by source Pc connected to terminal B3, the main group gate is closed.

Only during the period of coincidence of pulses from the said three sources are the said three gates simultaneously open, because the potential at the three terminals B1, B2, B3, is then not more negative than at the point A; a pulse of current accordingly flows from the point A to terminal B and thence via resistor R4 to the ungrounded pole of the battery, thus making the potential at said terminal B momentarily somewhat more positive than −40 v. and signalling the presence of a call to the call detector. It will be understood from the description of the pulse sources given herein with reference to Fig. 2, that said coincidence of pulses occurs during the pulse period of the source Pa, that is, during one hundredth part of the scanning cycle, and at an instant in that cycle that is characteristic of, and so is capable of identifying, the calling line; and that at all other times during the scanning cycle one or other of the three "gates" is closed and substantially no current flows towards terminal B.

It has now been explained how the scanning device serving a group of 100 subscribers' lines delivers a change of potential, or potential pulse, at its output terminal B, which may also be the input terminal of a call detector and calling line identifier, whenever a call appears on one of said lines; that said potential pulse is delivered once only during the repetitive scanning cycle of the device, at a preferred recurrence rate of 50 pulses per second; and that the instant in time with respect to said scanning cycle is characteristic of the particular line over which the call is being made.

The manner in which said pulse is utilized to control switching functions in the exchange is not a part of the present invention; however, in a preferred arrangement, a call detector and calling line identifier comprises, the reference again to Fig. 1, an amplifying device DA, of any suitable design, the input of which is connected to said terminal B and the output to the primary winding of a transformer T; a secondary winding of said transformer is connected to a call detecting relay R; another secondary winding is connected to a conductor F, which may lead to a calling line identifying device included, for example, in a register-sender. The device DA delivers through transformer T a train of amplified current pulses to operate relay R whenever a call appears on one of the subscribers' lines. It will be clear to one skilled in the art that said relay R can be arranged in any suitable manner to remain operated continuously during such a train of pulses, and can then, by means of contacts not shown, cause the seizure of a switching device, for example, a register-sender; that the similar train of current pulses, received in said register-sender over conductor F, can be compared with a standard train of pulses, or in any other suitable manner can be used to determine, from the position of the pulse in the pulse cycle, the identity of the calling line; and that the line finder SL can be directed in accordance with said determination to the bank contacts to which said calling line is connected.

When the calling line has been seized by the line finder SL, a line-busying potential is applied in conventional manner to the bank contact C; in the preferred embodiment, the exchange battery is connected thereto through a resistor R2 having a resistance, for example 250 ohms, which is low in comparison with those of resistors X, Y, and R1. The point A connected to said contact C is thereby brought to a potential lying between −44 v. and −48 v., depending upon the resistance of the line loop. This potential being again negative with respect to that at terminal B, the current pulses delivered by the scanning device to the call detector cease and the calling condition of the line has been removed.

In the event that several subscribers in a group of 100 subscribers make calls simultaneously, the pulses characterizing these various calls are successively received at terminal B and transmitted over the conductor F to the first register-sender which is seized; said register-sender responds to the first impulse which it receives, determines the number of the corresponding subscriber's line, directs a line finder to the bank contacts of that line and removes the calling condition therefrom. Since the relay R remains held, another register is seized, and so on, until all the calls have been dealt with. Relay R restores only when there is no longer an unsatisfied call existing in the group of 100 lines.

Of course, it would be possible, without departing from the scope of the invention, to modify the composition and number of the groups and sub-groups of lines in the scanning device, the number of gating elements in the device and the number of impulse sources being appropriately adjusted. It would be possible, for example, to divide the 100 lines into ten groups each of ten lines; there would then be ten group gates instead of four, and no sub-group gates, but a total of twenty different pulse sources would be required.

It is obvious also that the relay R can be replaced by any other device responsive to a brief current impulse and capable of closing a circuit, for example a gas-discharge tube.

It would also be possible without departing from the scope of the invention to interchange the grounded and the ungrounded poles of the exchange battery at all the points where either is shown connected in Fig. 1, provided that the polarity of all the rectifiers were reversed and that the potentials generated by the various sources of gating pulses were suitably modified.

We claim:

1. An automatic telephone system comprising a plurality of terminals arranged in a succession of grouping stages starting with one terminal in the first stage and having an increasing number of terminals in the successive stages, a plurality of coupling means for coupling each terminal to a plurality of terminals in the succeeding stage, each coupling means including a rectifier poled to prevent current flow between terminals of the same stage, a source of steady voltage having one pole connected to ground, a pair of resistors each connected at one end thereof to said one terminal and at the other end thereof to a different pole of said source, a rectifier connected to each of the other terminals of said plurality of terminals, means for maintaining a connection between one of said poles of said source of voltage and each terminal of the last stage, means for introducing a connection between the other of said poles and any particular terminal of said last stage to indicate an abnormal condition of said particular terminal, a source of potential intermediate the potentials of said poles, means at each of said rectifiers for connecting said rectifier to said source of intermediate potential except during predetermined intervals in a recurrent time cycle, said intervals being mutually related in a manner whereby a significant change of potential is produced at said one terminal during one of said intervals which is characteristic of said particular terminal, and means connected to said one terminal for responding to said change of potential.

2. A system according to claim 1, in which the means for connecting the rectifiers to a source of intermediate potential include a plurality of sources of potential pulses having predetermined recurrence rates, the pulses of the sources connected to terminals of the same stage having the same recurrence rate but having different time positions in their respective cycles, the duration of each pulse of the source connected to any one terminal being sufficient to encompass one pulse cycle of all the sources connected to terminals of succeeding stages connected to said one terminal.

3. A system according to claim 2, in which the sources of pulses are divided into groups, the pulses of the sources of each group having the same recurrence rate but having different time positions in their respective cycles from the pulses of every other source of that group, the recurrence rate of the pulses of each group of sources being a submultiple of that of the pulses of the group of sources connected to the terminals of a succeeding stage.

4. A system according to claim 3, in which the rectifier connected to each other terminal of the plurality of terminals for connecting said terminal to a source of intermediate potential is so poled as to offer its lower resistance to the flow of current therethrough between said terminal and said source of intermediate potential when the potential at said terminal lies between the potential of the other pole and said intermediate potential.

5. An automatic telephone system comprising a plurality of first terminals, a second terminal, a plurality of coupling means for coupling said second terminal to each of said first terminals, a source of steady voltage having one pole connected to ground, a pair of resistors each connected at one end thereof to said second terminal and at the other end thereof to a different pole of said source, a rectifier included in each coupling means between said first terminals and said second terminal, means for maintaining a connection between one of said poles and each of said first terminals, means for introducing a connection between the other of said poles and any particular one of said first terminals to indicate an abnormal condition of said particular terminal, a source of potential intermediate the potentials of said poles, means at each of said first terminals for connecting said terminal to said source of intermediate potential except during predetermined intervals in a recurrent time cycle, said intervals being mutually related in a manner whereby a significant change of potential is produced at said second terminal during one of said intervals which is characteristic of said particular terminal, and means connected to said second terminal for responding to said change of potential.

6. A system, according to claim 5, in which the means at each of the first terminals for connecting said terminal to a source of intermediate potential includes a rectifier.

7. A system, according to claim 6, in which the means for connecting the first terminals to the source of intermediate potential include a plurality of sources of potential pulses having the same recurrence rate but having different time positions in their respective cycles.

8. A system, according to claim 7, in which the rectifier included in the means at each of the first terminals for connecting said terminal to a source of intermediate potential is so poled as to offer its lower resistance to the flow of current therethrough between said terminal and said source of intermediate potential when the potential at said terminal lies between the potential of the other pole and said intermediate potential.

9. A system, according to claim 8, in which the rectifier included in the coupling means between each of the first terminals and the second terminal is so poled as to offer its lower resistance to the flow of current therethrough between said second terminal and the particular terminal when the connection between the other pole and said particular terminal has been introduced.

References Cited in the file of this patent

FOREIGN PATENTS

| | | |
|---|---|---|
| 615,271 | Great Britain | Jan. 4, 1949 |
| 618,488 | Great Britain | Feb. 22, 1949 |